United States Patent
Hirata et al.

(10) Patent No.: US 8,384,995 B2
(45) Date of Patent: Feb. 26, 2013

(54) REAR-SURFACE PROJECTION-TYPE VIDEO DISPLAY APPARATUS

(75) Inventors: Koji Hirata, Yokohama (JP); Hidehiro Ikeda, Yokohoma (JP); Toshihiko Matsuzawa, Kamakura (JP); Tadashi Sato, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/091,501

(22) Filed: Apr. 21, 2011

(65) Prior Publication Data

US 2011/0298993 A1    Dec. 8, 2011

(30) Foreign Application Priority Data

Jun. 4, 2010  (JP) ................................ 2010-128391

(51) Int. Cl.
*G03B 21/60* (2006.01)

(52) U.S. Cl. ........ 359/460; 359/453; 359/455; 359/456; 359/457

(58) Field of Classification Search ........... 359/443–461
See application file for complete search history.

(56) References Cited

U.S. PATENT DOCUMENTS

| | | | | |
|---|---|---|---|---|
| 6,031,664 | A * | 2/2000 | Goto | 359/456 |
| 7,281,805 | B2 * | 10/2007 | Hasegawa | 353/77 |
| 7,436,592 | B2 * | 10/2008 | Peterson | 359/443 |
| 7,495,828 | B2 * | 2/2009 | Ishii | 359/449 |
| 7,852,556 | B2 * | 12/2010 | Huang et al. | 359/457 |
| 7,872,801 | B2 * | 1/2011 | Kojima et al. | 359/457 |
| 2004/0218268 | A1 * | 11/2004 | Peterson | 359/457 |
| 2006/0007536 | A1 * | 1/2006 | Huang | 359/457 |
| 2006/0109569 | A1 | 5/2006 | Ogawa et al. | |
| 2007/0014005 | A1 * | 1/2007 | Peterson et al. | 359/460 |
| 2007/0115549 | A1 * | 5/2007 | Ishii | 359/460 |
| 2007/0165192 | A1 * | 7/2007 | Prior et al. | 353/78 |
| 2007/0297051 | A1 * | 12/2007 | Huang et al. | 359/457 |
| 2009/0135480 | A1 * | 5/2009 | Kojima et al. | 359/457 |

FOREIGN PATENT DOCUMENTS

| | | |
|---|---|---|
| JP | 2004-361539 | 12/2004 |
| JP | 2008-216796 | * 9/2008 |
| JP | 2008-216797 | 9/2008 |
| JP | 2009-163163 | * 7/2009 |
| JP | 2009-168871 | 7/2009 |

OTHER PUBLICATIONS

Extended European Search Report issued in European Patent Application No. EP 11003253.9 dated Aug. 21, 2011.

* cited by examiner

*Primary Examiner* — Clayton E Laballe
*Assistant Examiner* — Kevin Butler
(74) *Attorney, Agent, or Firm* — McDermott Will & Emery LLP

(57) ABSTRACT

A rear-type projection board apparatus (rear-surface projection-type video display apparatus), of new structure, having no necessity of a housing, being superior in portability, cheaply producible, comprises a transmission-type screen, being disposed within an interior space, under a condition of exposing both surfaces thereof in the space, and for transmitting a visual light projected onto a rear surface therethrough, so as to display it on a video display surface on a front surface, and a video projection apparatus (projector), being disposed at a predetermined position on a rear surface side of the transmission-type screen, and for projecting the visual light from a rear surface of the transmission-type screen, enlargedly, wherein the transmission-type screen has a Fresnel lens having Fresnel lens surfaces, covering over an entire light receiving surface for receiving the visual light, which is enlargedly projected from the video projection apparatus, whereby guiding the visual light received from the video projection apparatus into a direction perpendicular to the video display surface, while guiding external lights within the interior space downwards.

6 Claims, 11 Drawing Sheets

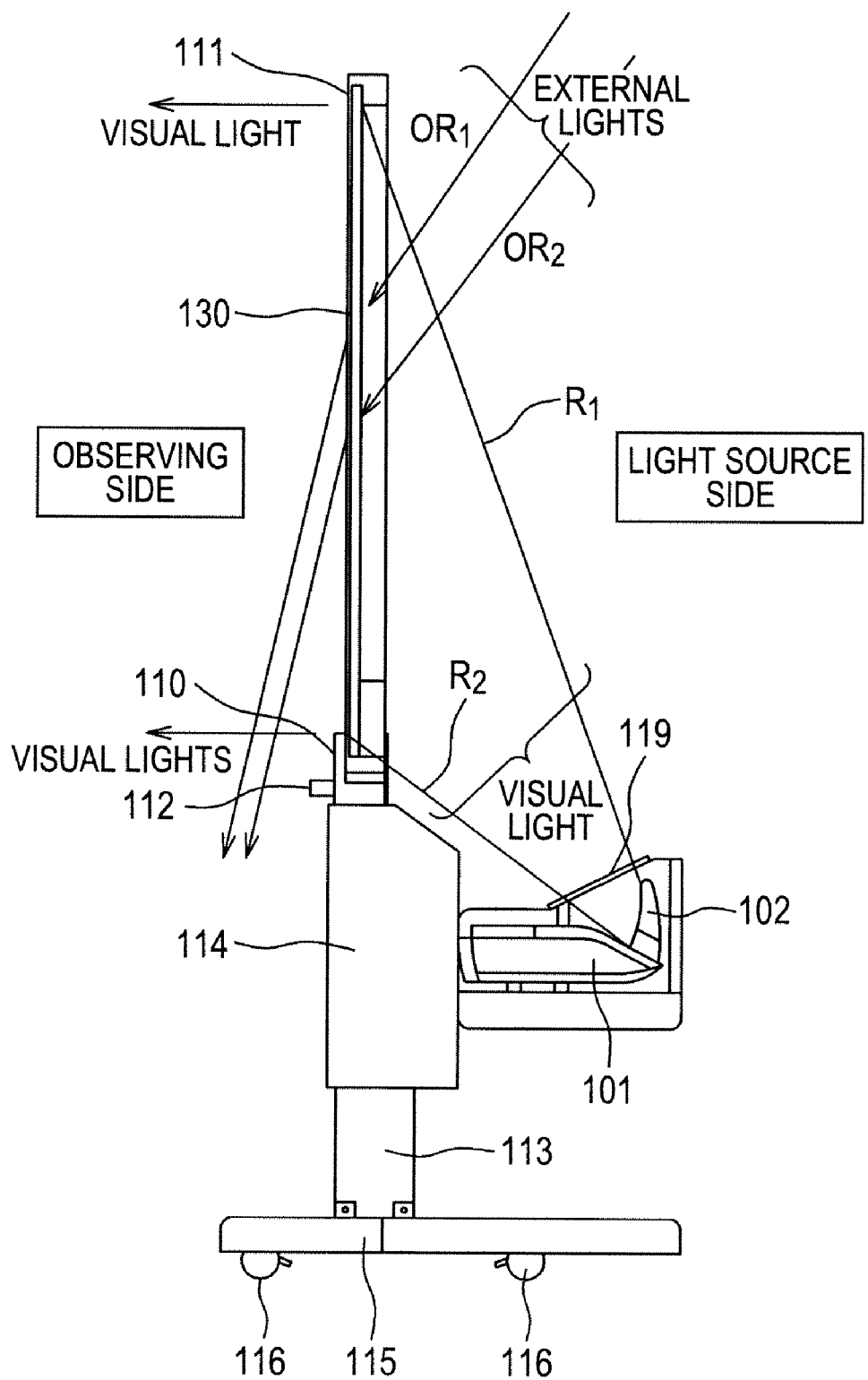

REAR-SURFACE PROJECTION-TYPE VIDEO DISPLAY APPARATUS

This application relates to and claims priority from Japanese Patent Application No. 2010-128391 filed on Jun. 4, 2010, the entire disclosure of which is incorporated herein by reference.

BACKGROUND OF THE INVENTION

The present invention relates to a rear-surface projection-type video display.

In recent years, developments are remarkable upon a large and flat video display apparatus, and in the place of the projection-type video display apparatus, which are widely used, conventionally, video display apparatuses come to be spread, widely, applying so-called a flat panel, such as, a plasma display panel (PDP), a large-size liquid crystal panel (LCP), and further an organic EL panel, etc., for example. Accompanying this, upon the projection-type video display apparatus, it is strongly demanded to be superior of portability and cheaply producible, as well as, further large-sizing of a display surface thereof, with using the characteristics thereof profitably, i.e., by taking a use thereof in an educational field or in a conference room, etc., into the consideration thereof.

On the other hand, in the conventional video display apparatus of projection-type, in particular, in a rear-surface projection-type video display apparatus of projecting an image or picture from a rear surface of a screen, generally, as is shown in Japanese Patent Laying-Open No. 2008-216797 (2008), for example, there are provided an optical engine for projecting a visual light and a plural number of mirrors for enlarging that visual light projected and also for entering it on the rear surface of the screen, within a housing, building up an cuter configuration of that apparatus. Also, as is disclosed in Japanese Patent Laying-Open No. 2009-168871 (2009) and Japanese Patent Laying-Open No. 2009-163163 (2009), the video projection apparatus is provided within an inside of that apparatus housing, and by means of a rear surface mirror attached on a rear surface of that apparatus housing, the visual light projected therefrom is enlarged and entered on the rear surface of the screen.

As was mentioned above, in the conventional video display apparatus of projection-type, in particular, in the rear-surface projection-type video display apparatus of projecting the visual from the rear surface of the screen, since a transmission-type screen (hereinafter, only "transmission screen") for displaying a picture on a front surface of a video display surface is attached on a front surface of the housing, building up the outer configuration of the apparatus as was mentioned above, a Fresnel lens attached on a back surface of that transmission screen is provided for transmitting the visual light received from the back surface therethrough, and commonly, it is made up with a plural number of Fresnel surfaces, which are formed in a circle ring manner (a circular Fresnel lens). Further, in the Patent Laying-Open No. 2008-216797 (2008), in particular, there is disclosed a refraction type Fresnel lens, height of which is so determined that stray lights in a predetermined area or region of Fresnel angle are emitted towards to the front surface facing to a viewer side.

BRIEF SUMMARY OF THE INVENTION

However, with the conventional technologies mentioned above, in particular, when taking the portability thereof into the consideration, it is necessary to carry the video display apparatus and the housing thereof, together, thus, the apparatus as a whole, therefore it is impossible to satisfy such requirement, fully. Furthermore, for such apparatus, it is more difficult to keep the superior portability thereof, in particular, accompanying with a trend of such large-sizing of the video display apparatus in recent years.

Then, according to the present invention, there is provided an extremely new structure of the video display apparatus, in the place of the general structure of the conventional one, i.e., a simple structure of removing the conventional housing of the apparatus therefrom. However, accompanying this, that transmission screen is disposed in the condition of exposing both surfaces thereof, within a space, such as, a room, etc.; however, according to the conventional technologies mentioned above, the transmission screen is of course must be attached on the front surface of the housing of the apparatus, and for that reason, it is impossible to dispose such transmission screen in the condition of exposing both surfaces thereof, within the space, such as, the room, (in other words, never considered).

Also, the Fresnel lens formed on an incident surface (i.e., the back surface) has, in general, lens surfaces of the circular Fresnel method, which are formed coaxially in the circular ring manner, together with a general projection/enlargement lens system, therefore, it is difficult to be manufactured, and this results into a cause of reason of increasing the production price of the rear-surface projection-type video display apparatus.

Thus, the present invention is accomplished by taking the conventional technologies mentioned above into the consideration thereof, and an object thereof is to provide a rear-surface projection-type video display apparatus having a new structure, in particular, being superior of the portability, as well as, producible cheaply.

According to the present invention, for accomplishing the object mentioned above, there is provided a rear-surface projection-type video display apparatus, comprising: a transmission-type screen, which is disposed within an interior space, under a condition of exposing both surfaces thereof in said space, and is configured to transmits a visual light projected onto a rear surface therethrough, so as to display it on a video display surface on a front surface; and a video projection apparatus, which is disposed at a predetermined position on a rear surface side of said transmission-type screen, and configured to project the visual light from a rear surface of said transmission-type screen, enlargedly, wherein said transmission-type screen has a Fresnel lens having Fresnel lens surfaces, covering over an entire light receiving surface for receiving the visual light, which is enlargedly projected from said video projection apparatus, whereby guiding the visual light received from said video projection apparatus into a direction perpendicular to said video display surface, while guiding lights within said interior space in a direction differing from that of said video projection apparatus into a direction other than that perpendicular to said video display surface.

Also, according to the present invention, within the rear-surface projection-type video display apparatus, as described in the above, it is preferable, said transmission-type screen has a rectangular configuration, and the Fresnel lens surfaces making up the Fresnel lens, which is formed on an entire of the video display surface, are formed in a direction parallel with a longitudinal direction of said screen, linearly, aligning with each other, and further it is preferable, said video projection apparatus is disposed at a position of a lower portion on the rear surface side of said transmission-type screen, and it projects the visual light directing to the light receiving surface of said transmission-type screen from said position.

And, further, it is preferable, a Fresnel angle defined by the Fresnel surfaces building up said Fresnel lens are so determined that the visual light projecting from said video projection apparatus, after entering into said Fresnel lens, is reflected by said Fresnel lens surfaces to emit, while the external light within said interior space, transmitting though said Fresnel lens, emits downwards.

Further, according to the present invention, within the rear-surface projection-type video display apparatus, as described in the above, it is preferable, said video projection apparatus comprises a light source, a modulator unit, which is configured to modulate a part of light from said light source, so as to form the visual light, and an optic system, which is configured to project the visual light formed by said modulator unit, enlargedly, directing to the light receiving surface of said transmission-type screen, and wherein said optic system enlarges the visual light by a reflection plate formed with a free-curved surface, at a final stage, and irradiates it on the light receiving surface of said transmission-type screen, and also it is preferable, further comprising a member, which is configured to fix said transmission-type screen at a predetermined position within said interior space, and a member, which is configured to dispose said video projection apparatus at a predetermined position with respect to said transmission-type screen, in a part of said fixing member. And, it is also preferable, said position fixing member is detachable with respect to said transmission-type screen.

BRIEF DESCRIPTION OF THE DRAWINGS

Those and other objects, features and advantages of the present invention will become more readily apparent from the following detailed description when taken in conjunction with the accompanying drawings wherein:

FIG. 9 is a view for explaining the characteristics and operations of the rear-surface projection-type video display apparatus, further including a way of treating thereof;

DETAILED DESCRIPTION OF THE PREFERRED EMBODIMENTS

Figure 1:
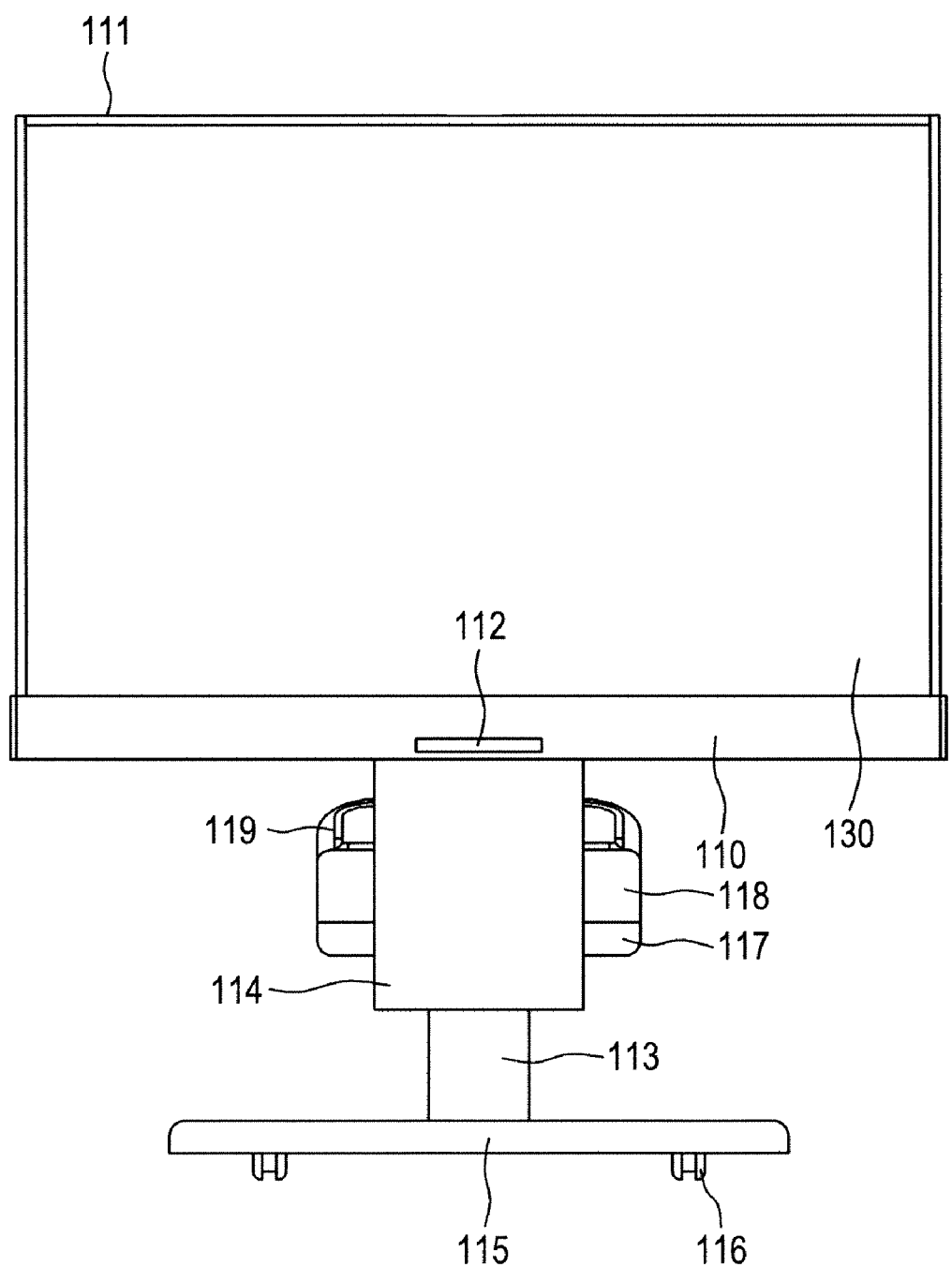
FIG. 1 is a front view for showing the entire structure of a projection board of a rear-type (rear-surface projection-type video display apparatus), according to the present invention.

Hereinafter, embodiments according to the present invention will be fully explained by referring to the attached drawings. However, in the figures shown below, each constituent element having the same function will be shown by attaching the same reference numeral, and also the explanation about that once explained will be omitted, thereafter.

Figure 2:
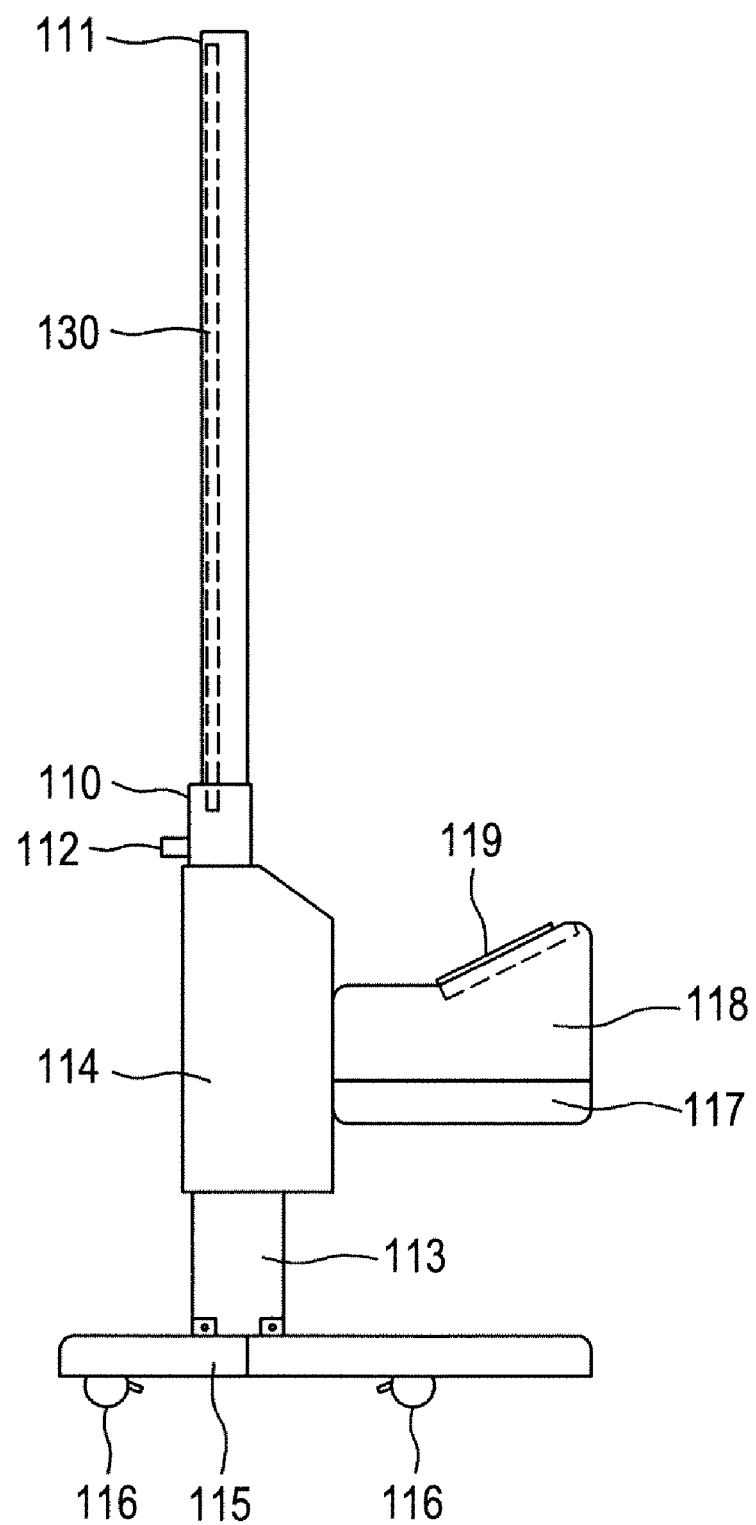
FIG. 2 is a side view for showing the entire structure of the projection board of the rear-type (rear-surface projection-type video display apparatus)
Figure 3:
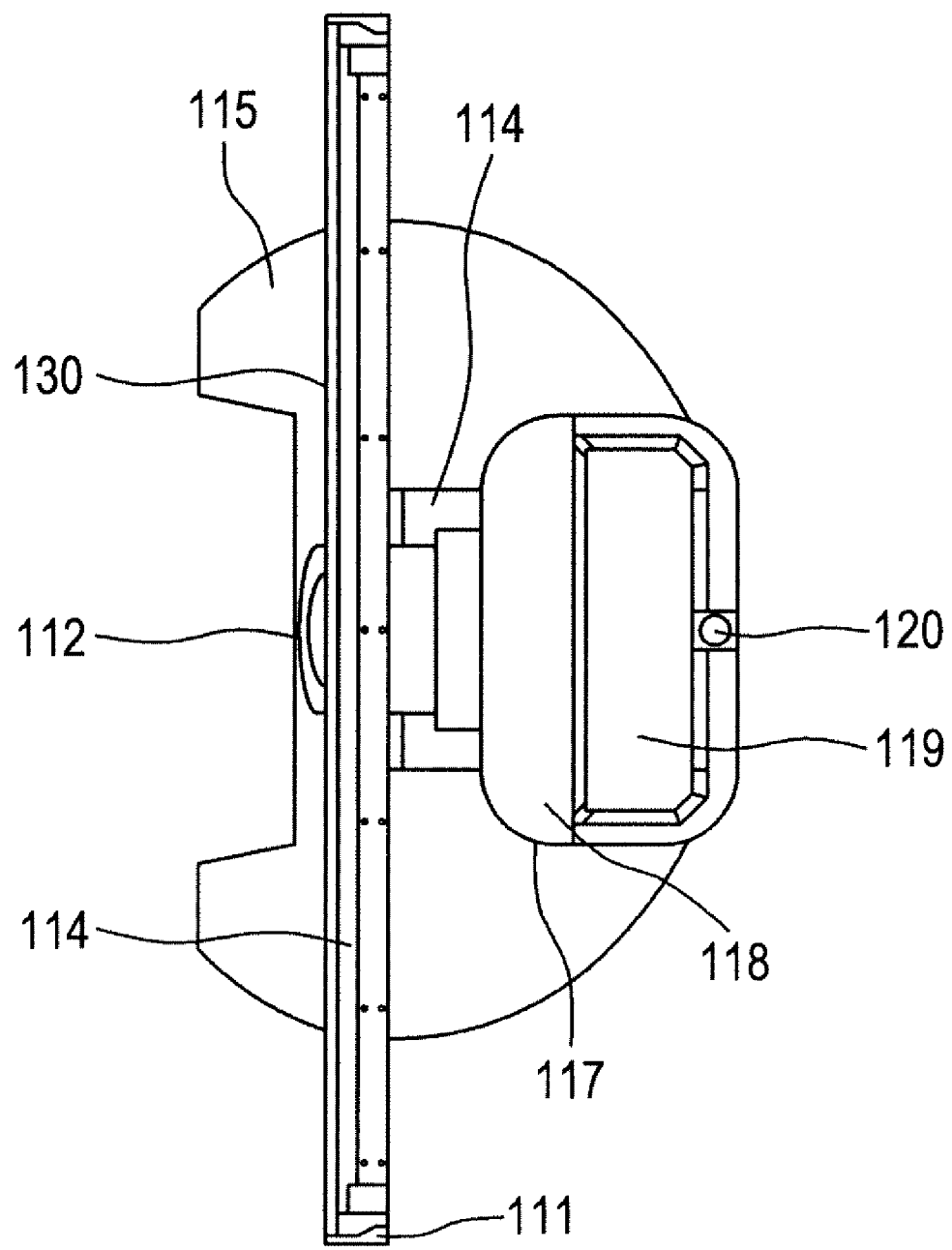
FIG. 3 is an upper view for showing the entire structure of the projection board of the rear-type (rear-surface projection-type video display apparatus)

First of all, in FIGS. 1 to 3 is shown the entire structures of so-called a projection board apparatus of a rear-type (thus, rear-surface projection-type video display apparatus), by a front view, a side view and an upper view thereof. In those figures, a reference numeral 130 depicts a transmission-type screen (hereinafter, only "transmission screen"), the detailed structure of which will be explained hereinafter, and it shows a longitudinal one having an aspect ratio, 16:9, for example, of the projection surface thereof. This transmission screen 130 is surrounded by a supporting frame 111 on the peripheries thereof, and at about a central portion of a supporting frame reinforcement member 110 of a lower portion thereof is attached a handle 112, projecting like "U" shape to the display surface side.

And, the transmission screen 130 mentioned above is disposed within an interior space, for example, including a class room and a conference room and so on therein, by a screen holding member (e.g., a stand) 113, thereby under the condition of standing up, i.e., perpendicular to a floor surface. In more details, on an upper portion of the screen holding member (stand) 113 is attached a screen holder portion 114, being box-like in the outer configuration thereof, and the screen 130 mentioned above is amounted, detachably, and fixed on an upper surface of that screen holder portion 114. Also, at a lower end of this screen holder portion (stand) 113 is formed a leg portion, having an outer configuration of being about overall in the shape and cut off a part thereof. Further, on a bottom surface of the leg portion are provided casters 116 for use of movement, and with those can be achieved a projection board, which can move easily, as the apparatus as a whole.

Further, on a rear surface side of the screen holder portion 114 mentioned above is provided a member, for disposing the video projection apparatus (e.g., projector), the detailed structure of which will be explained later, within an inside thereof, i.e., a projector install portion 117, in a detachable manner. Further, a reference numeral 118 depicts a wall portion for defining a storage space of the video projection apparatus (projector). With such structure as is mentioned above, as apparent from the figure, only by putting it on that install portion 117, it is possible to dispose the video projection apparatus (projector) at a desired position with respect to the transmission screen 130 mentioned above. Also, a reference numeral 119 in the figure depicts a transmission window, attached in a part of the install portion 117 mentioned above, for transmitting a visual light from the video projection apparatus (projector) into an outside (i.e., direction onto the transmission screen 130).

Figure 4:
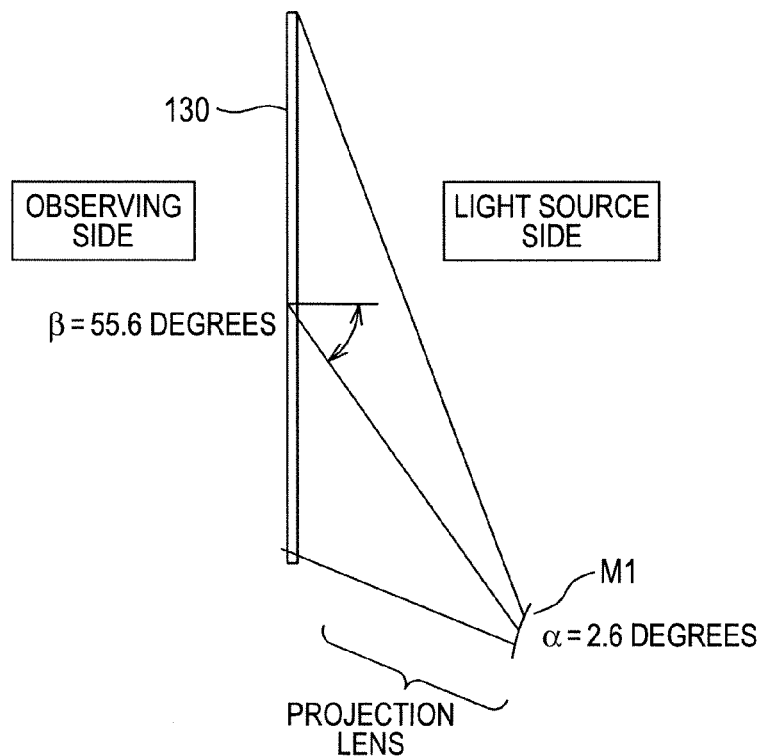
FIG. 4 is a cross-section view for showing a projection lens and a transmission screen of an oblique projection optic system in the projection board mentioned above.

Following to the above, FIG. 4 attached herewith is the cross-section view for showing a relationship between the projection lens and the transmission screen 130 mentioned above, within an oblique projection optic system in the projection board (rear-surface projection-type video display apparatus) mentioned above. Thus, plural pieces of projection lenses building up the optic system of the video projection apparatus (projector), which is stored within the install portion 117 mentioned above, are so disposed, in a lower portion of the transmission screen 130, that they define an inclination angle thereof α=2.6 degrees, for example. Also, the visual light projecting from those projection lenses reflected upon a reflector plate provided in a last stage, i.e., a reflection mirror M1, and an enlarged visual light enters on a light receiving surface of the transmission screen 130 mentioned above, covering all over the surface thereof, for example, at a central incident angle β=55.6 degrees.

Figure 5:
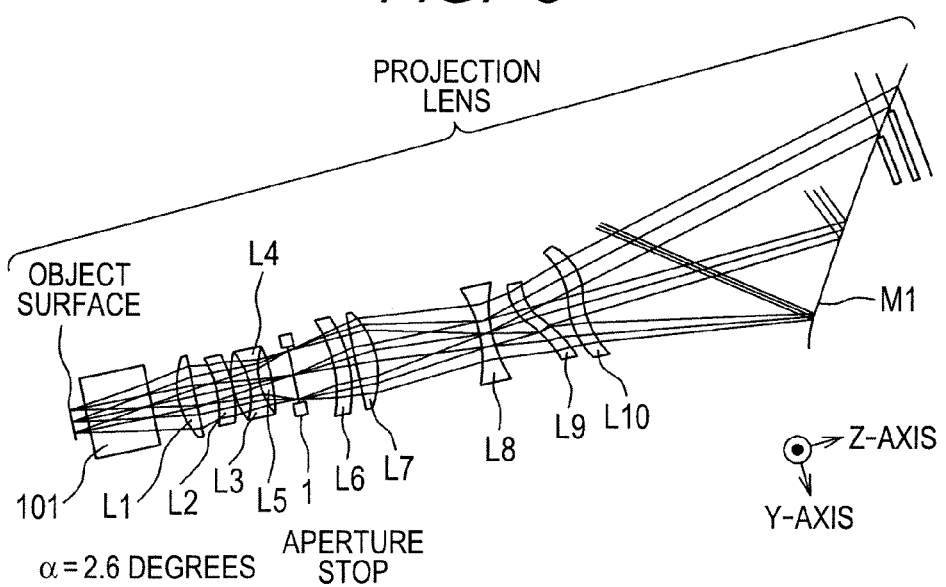
FIG. 5 is a cross-section view for showing an example of the detailed structure of a lens group building up the projection lens.

FIG. 5 shows examples of the detailed structure of the projection lens mentioned above, and further the details of lenses L1-L10 building up this projection lens are shown in the following table 1, including an "Object Surface" and a "Conversion Filter" 101 therein.

TABLE 1

| Name | Surface No. | Shape | Radius of Curvature | Distance between Surfaces | Refractive Index/Abbe Number |
|---|---|---|---|---|---|
| Object Surface | (0) | Spherical | ∞ | 5.977 | |
| Conversion Filter | (1) | Spherical | ∞ | 26.395 | 1.51680/64.20 |
| | (2) | Spherical | ∞ | 11.5465284 | |
| L1 | (3) | Spherical | 40.176 | 4.9 | 1.5251/56.46 |
| | (4) | Spherical | −176.637 | 12.648 | |
| L2 | (5) | Aspheric | −167.959 | 5.89 | 1.5251/56.46 |
| | (6) | Aspheric | −122.832 | 0.300 | |
| L3 | (7) | Spherical | 401.653 | 6 | 1.48749/70.44 |
| L4 | (8) | Spherical | −17.707 | 2 | 1.84666/23.78 |
| L5 | (9) | Spherical | 50.018 | 5.7 | 1.48749/70.44 |
| | (10) | Spherical | −26.002 | 0 | |
| | (11) | Spherical | ∞ | 35.974 | |
| L6 | (12) | Aspheric | −66.6459 | 6 | 1.4909/58.03 |
| | (13) | Aspheric | −62.2313 | 0.3 | |
| L7 | (14) | Spherical | 105.0660 | 8.3 | 1.80610/33.27 |
| | (15) | Spherical | −71.1810 | 36.896 | |
| L8 | (16) | Spherical | −30.4830 | 2 | 1.48749/70.44 |
| | (17) | Spherical | 45.8480 | 19.722 | |
| L9 | (18) | XY Polynomial Surface | ∞ | 6 | 1.4909/58.03 |
| | (19) | XY Polynomial Surface | ∞ | 5.146 | |
| L10 | (20) | XY Polynomial Surface | ∞ | 6 | 1.4909/58.03 |
| | (21) | XY Polynomial Surface | ∞ | 119.906 | |
| M1 | (22) | XY Polynomial Surface | ∞ | 0 | Reflection Surface |
| | (23) | Spherical | ∞ | Z (Other Table) | |
| Image Surface | (24) | Spherical | ∞ | 0 | |

Also, the surfaces (e.g., $5^{th}$ surface, $6^{th}$ surface, $12^{th}$ surface and $13^{th}$ surface) forming the lenses L2 and L6, which are shown by "Aspheric" in the table 1 mentioned above, can be presented by the following equation, in general:

$$Z = \frac{c \cdot h2}{1 + \sqrt{1 - (1+K)c2 \cdot h2}} + A \times h4 + B \times h6 + C \times h8 + D \times h10 + E \times h12 + F \times h14 + G \times h16 + H \times h18 + J \times h20$$

However, aspheric coefficients in the equation of the aspheric surface mentioned above, i.e., values of "1/c", "K", "A"-"J", on the $5^{th}$ surface, $6^{th}$ surface, $12^{th}$ surface and $13^{th}$ surface, are as shown in the following table 2.

TABLE 2

| | $5^{th}$ Surface | $6^{th}$ Surface | $12^{th}$ Surface | $13^{th}$ Surface |
|---|---|---|---|---|
| 1/c | −167.959 | −122.832 | −66.6459 | −62.2313 |
| K | 172.744 | 0 | −0.153937 | 0.206380 |
| A | −2.66335E−05 | −2.38519E−05 | 3.76738E−06 | 3.96741E−06 |
| B | 7.92220E−8 | 3.17440E−08 | 1.42797E−08 | 1.09868E−8 |
| C | −5.26342E−10 | −1.61512E−10 | 3.16419E−11 | 1.58678E−11 |
| D | 6.67854E−12 | 3.52176E−12 | −9.44863E−14 | −5.49933E−15 |
| E | 7.04598E−15 | 8.65106E−15 | −7.39034E−17 | −1.15325E−16 |

TABLE 2-continued

| | $5^{th}$ Surface | $6^{th}$ Surface | $12^{th}$ Surface | $13^{th}$ Surface |
|---|---|---|---|---|
| F | −3.43447E−16 | −3.83917E−16 | 1.07298E−18 | 1.50989E−19 |
| G | −5.57170E−19 | −1.00491E−18 | −2.57004E−24 | −2.80136E−24 |
| H | 2.04723E−20 | 3.44806E−20 | 2.57004E−24 | −2.80136E−24 |
| J | −5.52648E−23 | −1.20548E−22 | 1.18394E−29 | 2.53254E−27 |

Also, the surfaces ($18^{th}$ surface, $19^{th}$ surface, $20^{th}$ surface $21^{st}$ surface) forming the lenses L9 and L10, which are indicated as "XY Polynomial Equation" in the table 1 mentioned above, and further the surface ($22^{nd}$ surface) forming the above-mentioned mirror M1 can be presented by the following equation.

$$Z = \frac{c \cdot (x^2 + y^2)}{1 + \sqrt{1 - (1+K) \cdot c^2 \cdot (x^2 + y^2)}} + \sum\sum Cj(m,n) \cdot x^m \cdot y^n$$

$$j = [(m+n)2 + m + 3n]/2 + 1$$

However, coefficients of free-curved surface in the equation for presenting the free-curved surface mentioned above ("XY Polynomial Surface"), i.e., values of "1/R", "K", "C3"-"C66" are as shown in the following table 3.

TABLE 3

| Code | | $18^{th}$ surface | $19^{th}$ surface | $20^{th}$ surface | $21^{st}$ Surface | $22^{nd}$ Surface |
|---|---|---|---|---|---|---|
| 1/R | c | 0 | 0 | 0 | 0 | 0 |
| K | K | 0 | 0 | 0 | 0 | 0 |
| C3 | $Y^1$ | 0.751345217 | 0.78007117 | 0.317146197 | 0.282854435 | 0.544526224 |
| C4 | $X^2$ | −0.01758175 | −0.011522589 | 0.00789724 | 0.009148087 | 0.003714338 |
| C6 | $Y^2$ | −0.02124885 | −0.027915463 | 0.019783429 | 0.024311975 | 0.000924242 |
| C8 | $X^2Y$ | 0.000222852 | 0.000410962 | 0.000172737 | 0.000152295 | 6.02681E−05 |
| C10 | $Y^3$ | −0.001815279 | −0.002003168 | 0.000578679 | 0.000810141 | 2.07306E−05 |
| C11 | $X^4$ | −3.08048E−05 | −3.06833E−05 | −1.52049E−05 | −1.69764E−05 | −1.75992E−07 |
| C13 | $X^2Y^2$ | 9.50625E−05 | 7.78647E−05 | −3.37202E−05 | −4.88457E−05 | 7.26017E−07 |
| C15 | $Y^4$ | 3.03736E−05 | 4.75846E−05 | −1.93278E−05 | −1.94222E−05 | 2.93839E−07 |
| C17 | $X^4Y$ | −3.62457E−06 | −3.38545E−06 | −1.38678E−06 | −1.2879E−06 | −5.87712E−09 |
| C19 | $X^2Y^3$ | 1.6436E−06 | −1.30846E−06 | −1.786E−06 | −2.36902E−06 | 6.93373E−09 |
| C21 | $Y^5$ | 2.68751E−06 | 2.23615E−06 | −1.44908E−06 | −1.55877E−06 | 3.7941E−09 |
| C22 | $X^6$ | 1.13872E−07 | 6.93151E−08 | 1.62591E−08 | 1.5632E−08 | 2.56251E−11 |
| C24 | $X^4Y^2$ | −2.76227E−07 | −8.74443E−08 | −2.99468E−08 | 6.47985E−09 | −1.19259E−10 |
| C26 | $X^2Y^4$ | −1.92564E−07 | −1.65778E−07 | −2.12785E−08 | −8.72645E−09 | 2.15129E−11 |
| C28 | $Y^6$ | −4.67109E−10 | −3.89024E−08 | −3.34103−E08 | −2.85206E−08 | 3.73103E−11 |
| C30 | $X^6Y$ | −1.20879E−08 | −1.1772E−08 | 1.27991E−09 | 1.70847E−09 | 7.42243E−13 |
| C32 | $X^4Y^3$ | −1.05915E−8 | 5.64453E−09 | −7.1992E−10 | 2.025113E−09 | −1.71322E−12 |
| C34 | $X^2Y^5$ | −0.46258E−9 | 2.79616E−09 | 7.89308E−10 | 2.41317E−09 | −1.0714E−12 |
| C36 | $Y^7$ | 4.9728E−10 | 5.18671E−10 | −4.36801E−10 | 3.17904E−10 | 4.63964E−13 |
| C37 | $X^8$ | −1.07985E−10 | −5.10075E−11 | −1.80567E−11 | −1.42035E−11 | −3.16657E−15 |
| C39 | $X^6Y^2$ | −1.19793E−10 | −7.01E−10 | 3.98188E−11 | 3.18713E−11 | 1.31587E−14 |
| C41 | $X^4Y^4$ | 2.80851E−10 | 2.48715E−10 | −4.84575E−11 | 2.46308E−11 | −1.9509E−14 |
| C43 | $X^2Y^6$ | 2.9954E−11 | 2.73242E−10 | 3.81109E−11 | 4.79457E−11 | −2.32612E−14 |
| C45 | $Y^8$ | 6.5869E−11 | 6.47438E−11 | 4.89405E−12 | 2.00339E−11 | 7.93177E−15 |
| C47 | $X^8Y$ | 6.94945E−11 | 4.35876E−11 | −7.8119E−13 | −1.47199E−12 | −6.54372E−17 |
| C49 | $X^6Y^3$ | 3.7162E−11 | −1.70584E−11 | 1.03985E−12 | −7.10612E−13 | 1.49368E−16 |
| C51 | $X^4Y^5$ | 2.86518E−11 | 1.74347E−12 | −2.41585E−12 | −1.94158E−12 | −1.65368E−16 |
| C53 | $X^2Y^7$ | 5.26582E−12 | 7.06206E−13 | 3.20388E−13 | −1.12981E−12 | −1.95843E−16 |
| C55 | $Y^9$ | −2.75688E−12 | −2.04243E−12 | 7.20951E−13 | 2.40184E−13 | 8.07433E−17 |
| C56 | $X^{10}$ | 3.54774E−13 | 2.19244E−13 | 2.49719E−14 | 1.64795E−14 | 7.48982E−20 |
| C58 | $X^8Y^3$ | 3.06388E−12 | 1.72361E−12 | −4.25312E−14 | −5.97791E−14 | −5.10157E−19 |
| C60 | $X^6Y^4$ | 4.36927E−13 | −4.88938E−13 | 2.28321E−14 | −1.05274E−14 | 8.39697E−19 |
| C62 | $X^4Y^6$ | 5.73606E−13 | 4.39862E−14 | −4.41159E−14 | −4.63017E−14 | −7.37124E19 |
| C64 | $X^2Y^8$ | −9.59911E−15 | −1.02118E−13 | −1.20084E−14 | −3.50914E−14 | −5.89462E−19 |
| C66 | $Y^{10}$ | −1.10234E−13 | −7.22795E−14 | 1.18093E−14 | −1.22963E−15 | 3.12009E−19 |

Figure 6A:
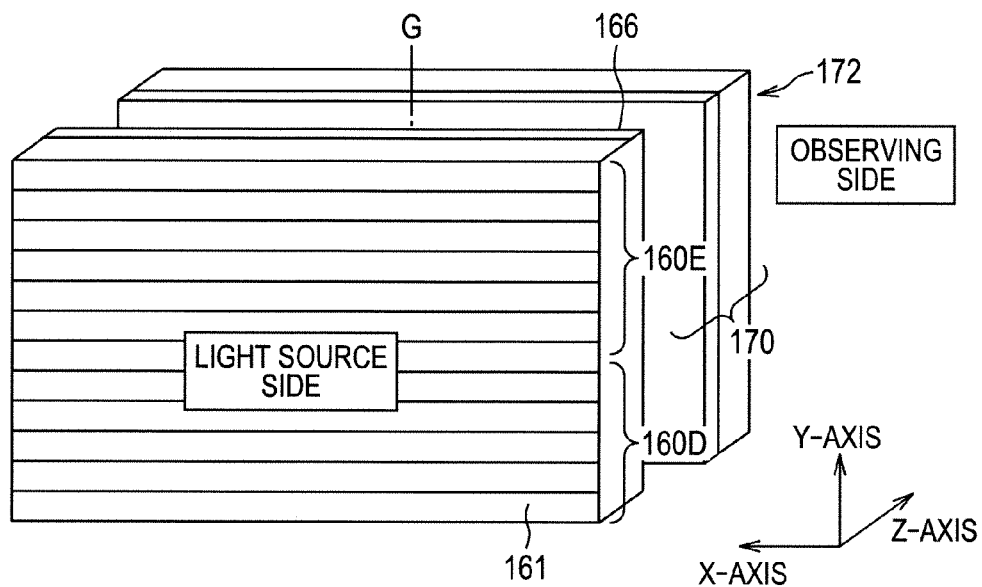
FIGS. 6A and 6B are a perspective view for showing an example of the detailed structure of the transmission screen, and also an enlarged cross-section of a part thereof, respectively.
Figure 6B:
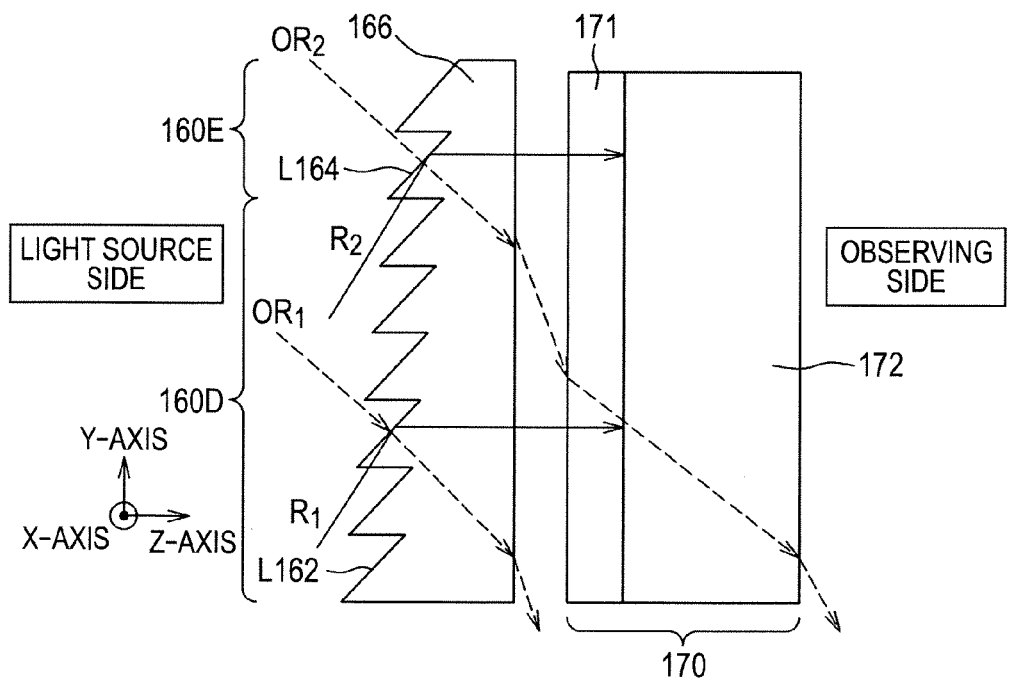

Following to the above, in FIGS. 6A and 6B and FIGS. 7A and 7B attached herewith are shown an example of the detailed structures of the transmission screen 130 mentioned above. Firstly, those FIGS. 6A and 6B show a Fresnel lens 166 and a diffusion sheet 170 (for example, a lenticular sheet), which are formed separately, are combined with, and thereby building up the transmission screen 130 mentioned above, wherein the Fresnel lens 166 is disposed on a light source side while the diffusion sheet 170 is disposed on an observing or viewing side. And, as is clear in FIG. 6B, upon the entire surface of the screen, the Fresnel lens surfaces L162 and L164, forming the Fresnel lens 166, guide the lights (visual lights: R1 and R2), entering from the video projection apparatus (projector), towards to the observing side (i.e., in the direction perpendicular to the screen surface, and guide or direct external lights OR1 and OR2 into a direction differing from the propagating direction of the visual lights, for example, towards to a lower side of the screen. However, herein, the external lights mentioned above are lights irradiating on that screen, in general, when the projection board apparatus is disposed within the interior space, for example, there can be considered the lights due to an interior lighting, mainly. Those external lights are irradiated from above, mostly.

However, in those figures mentioned above, in actual, since the lights (visual lights: R1 and R2) entering from the video projection apparatus (projector) mentioned above differ from, in the incident angle thereof, depending on the position (in the figures, an upper position and a lower position), respectively, then the Fresnel lens 166 is divided into plural numbers (actually, a large number) of areas or regions 160D and 160E (herein, although showing an example of being divided into two (2) areas, but actually, it is divided into a large number of the areas). And, the Fresnel lens surfaces L162 and L164 are formed at the angles differing from, respectively. Also, reference numerals 171 and 172 depict a diffusion layer and a base material of sheet, respectively, which build up the diffusion sheet 170 mentioned above.

Figure 7A:
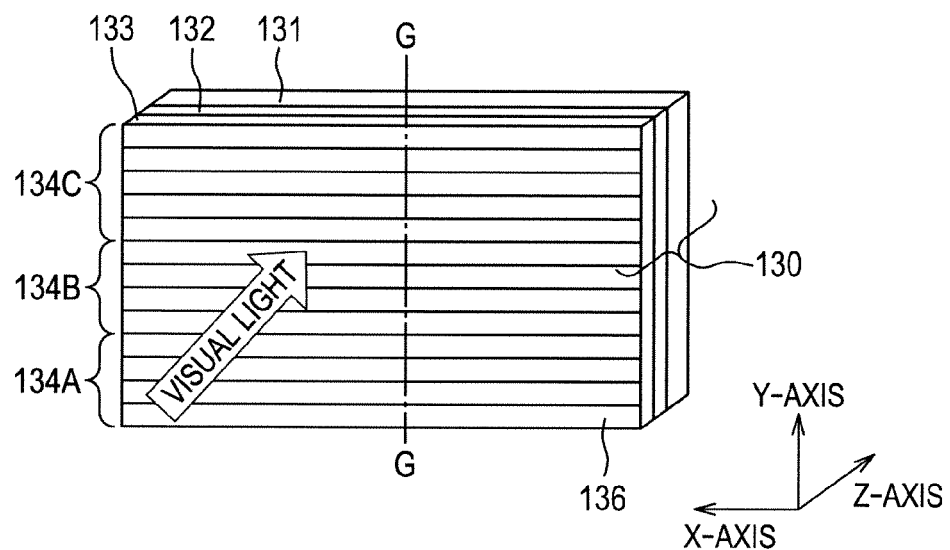
FIGS. 7A and 7B are a perspective view for showing other example of the detailed structure of the transmission screen, and, also an enlarged cross-section of a part thereof, respectively.
Figure 7B:
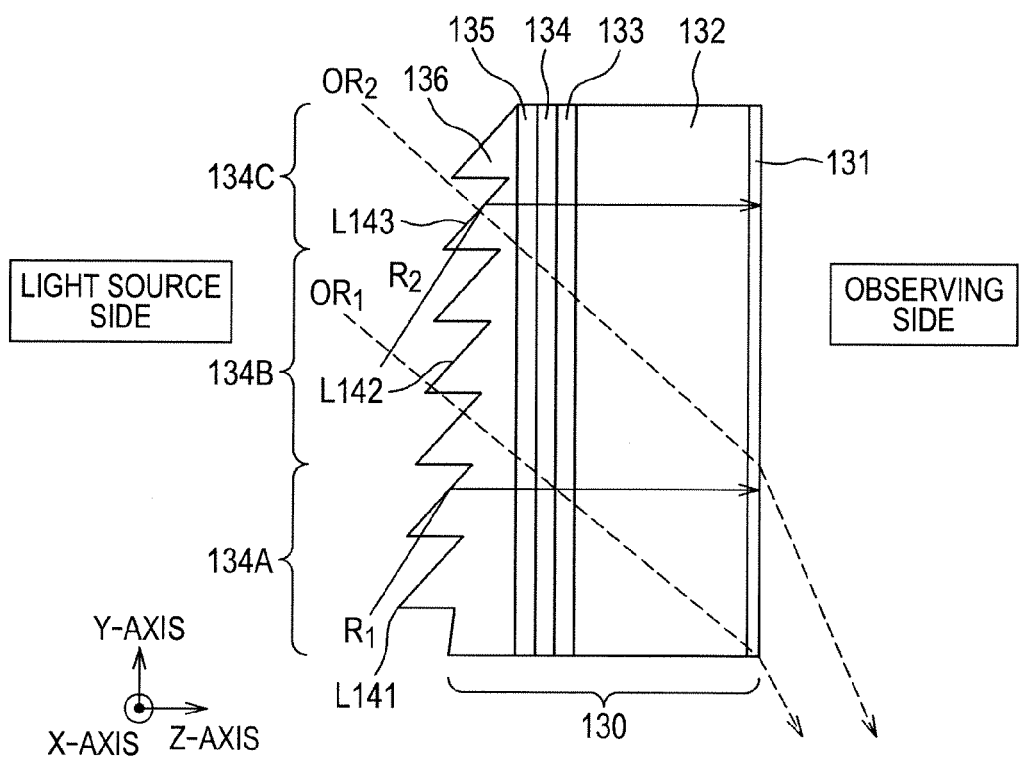

On the other hand, FIGS. 7A and 7B show the Fresnel lens formed in one body together with the transmission screen 130 mentioned above, i.e., the Fresnel lens 136 is formed on the back side (i.e., an incident surface of the visual light) of the screen. However, with this Fresnel lens 136, as is apparent from FIG. 7B, the Fresnel surfaces L141, L142 and L143 for forming the Fresnel lens guide or direct, on the entire surface thereof, the lights (R1 and R2) entering from the video projection apparatus (projector) mentioned above, to the observing side, and at the same time, guide or direct the external lights OR1 and OR2 down to the lower side of the screen. Also, the surface of the Fresnel lens is shown under the condition of being divided into three (3) areas or regions 134A, 134B and 134C. And, a reference numeral 131 in the figure depicts a hardened surface layer (a hard coat layer) formed on a surface side of the screen 130 for protecting the observing side thereof from being injured, 132 the base material of sheet, 133 the diffusion layer, 134 an adhesive layer, and 135 the base material of Fresnel lens, respectively.

Figure 8:
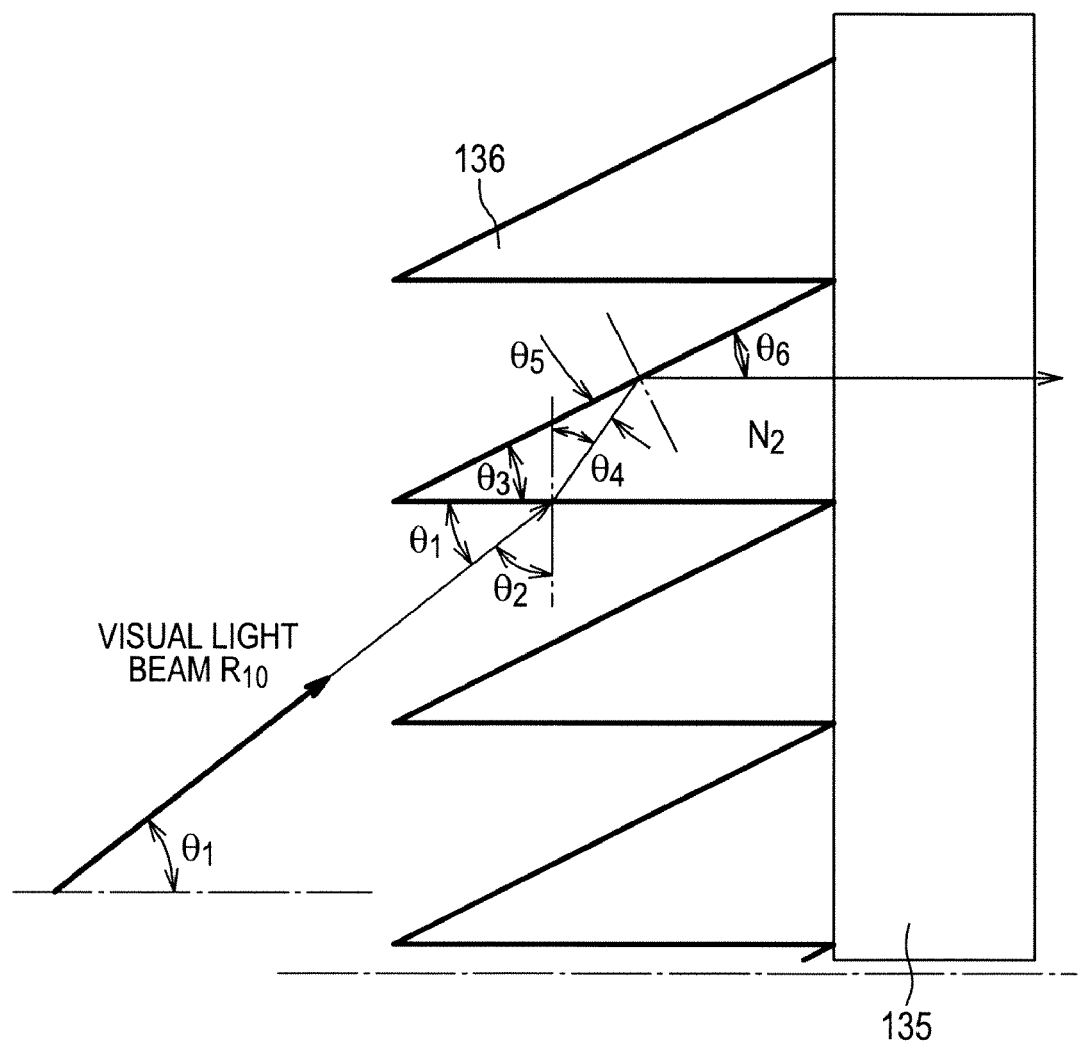
FIG. 8 is a view for showing further detailed configuration of the Fresnel lens mentioned above.

Following to the above, FIG. 8 attached herewith shows the further detailed structures of the Fresnel lens 136 (or 166) mentioned above, and in this figure is shown the case where the visual light beam $R_{10}$ from the video projection apparatus (projector) enters onto the horizontal surface at an incident angle $\theta_1$. This visual light beam $R_{10}$, as is apparent from the figure, after entering into a lower surface of the Fresnel lens 136, is totally reflected on the Fresnel lens surface within that lens, and thereafter emits towards to the observing side (i.e., in the direction perpendicular to the screen surface), transmitting through the Fresnel base material 135. A relationship between Fresnel angles, which are defined by the Fresnel surfaces L141-L143, L162 and L164, are as follows, from the Snell's law:

$$N_1 \sin g\theta_2 = N_2 \sin g\theta_4 \quad \text{(Eq. 1)}$$

Where, marks in the equation present the followings:
$N_1$: refraction index of air 1.0, $\theta_1$: incident angle of visual light
$N_2$: refraction index of Fresnel lens, $\theta_2$: incident angle of visual light onto Fresnel lens
$\theta_3$: Fresnel angle, $\theta_4$: refracting angle of visual light on incident surface of Fresnel lens
$\theta_5$: incident angle of visual light upon entire reflection surface,
$\theta_6$: incident angle of visual light from entire reflection surface
Also, from FIG. 8, each angle can be presented, respectively as below.

$$\theta_3 = \theta_6 = \theta_5 \quad \text{(Eq. 2)}$$

$$\theta_4 = 180 - (\theta_3 + \theta_5) - 90 \quad \text{(Eq. 3)}$$

$$\theta_4 = 90 - (\theta_3 + \theta_5) \quad \text{(Eq. 4)}$$

Further, from the (Eq. 2) and (Eq. 4) can be delivered the following equations:

$$\theta_3 = (90 - \theta_4)/2 \quad \text{(Eq. 5)}$$

$$\theta_1 = 90 - \theta_2 \quad \text{(Eq. 6)}$$

Thus, from the relationship of the above (Eq. 6) and further those (Eq. 1) and (Eq. 2) mentioned above, with using an emission angle $\theta_1$ of the visual light emitting towards to the transmission screen as a parameter, and if assuming that the emission light from the transmission screen emits into the direction perpendicular to an emission surface of that transmission screen, those Fresnel angles can be calculated, respectively.

Following to the above, explanation will be given hereinafter, about the characteristics and the operations, and further including a way of treating thereof, of the projection board apparatus of the rear-surface type according to the present invention, the detailed structures of which were explained in the above, i.e., the rear-surface projection-type video display apparatus, by referring to FIG. 9. However, in addition to the constituent elements mentioned above, this figure shows therein, the video projection apparatus (projector) by a reference numeral 101, and also the reflection mirror thereof by a reference numeral 102, respectively.

First of all, as was explained in the above, the rear-surface projection-type video display apparatus, according to the present invention, do not have housing, which is common with the conventional projection-type video display apparatus. For this reason, with the apparatus according to the present invention, it is possible to reduce a number of the constituent elements thereof, much more, and thereby achieving a much cheaper rear-surface projection-type video display apparatus. Also, as apparent from the structure mentioned above, the transmission screen 130 has an outer configuration like a board or plate, and is held by the screen holder portion (stand) 113, in more details, it is attached on the screen holder portion, detachably, and therefore, in particular, when trying to store or transport that apparatus a place of long-distance (including the time when shipping), those can be divided and also packed, separately or independently, to be transported; i.e., extremely convenient. Also, as was mentioned above, as well as, making the screen holder portion (stand) 113 detachable from the screen, further, by making the leg portion 115 of that stand detachable from the screen holder portion (stand) 113 (or, folding or collapsible), it is possible to reduce a volume of the outer configuration of that stand, much more, and this is also convenient when transporting it/them.

Namely, with the conventional structure having the housing, sizes of the entire thereof also become large, accompanying the large-sizing of the display surface thereof; however, with the structure according to the present invention mentioned above, only an area of the transmission screen becomes large. Also, in spite of difference of the size of that screen, it is possible to use other constituent elements (for example, the screen holder portion (stand) 113 and the video projection apparatus 101, etc.), in common, and therefore, being preferable from a viewpoint of manufacturing thereof. Also, with the conventional structure having the housing thereof, there is a concern that the position of a rear-surface mirror, which is attached on the rear-surface within a backboard building up the housing, shifts due to a shock generating on the way thereof, in particular, when transporting it; however, with the structure according to the present invention, it is clear that such problem can be dissolved, easily.

However, as was mentioned above, with the rear-surface projection-type video according to the present invention, since it has no such housing, the external lights OR1 and OR2, including the lights from the lighting within a room, enters on a rear surface of the screen (i.e., an incident surface of the visual light), within the interior space, in which the apparatus is installed, when installing the transmission screen 130 under the condition of standing straight by means of the screen holder portion (stand) 113, for example, within the interior space, such as, a class room, a conference room, etc., and this brings about a lowering of displaying performances of the apparatus, in particular, the contrast thereof. However, with the structure according to the present invention, in particular, the structure of the transmission screen 130, the details thereof being explained in the above, the visual lights (R1-R2) from the reflection mirror 102, which builds up the video projection apparatus (projector) 101, are guided into a direction perpendicular to the surface of the transmission screen 130 (i.e., towards the observing side); however, since the external lights OR1 and OR2 are guided downwards, different from the visual lights, from the transmission screen 130, they never bring about such problem (e.g., lowering of the contrast) as was mentioned above.

Figure 10A:
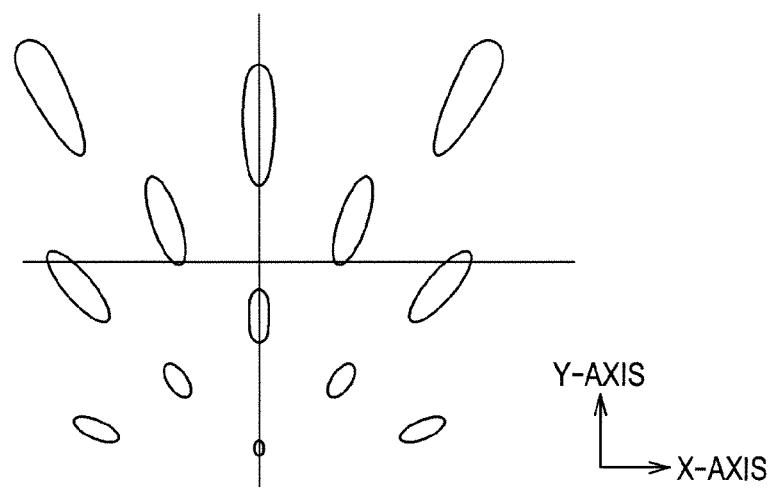
FIGS. 10A and 10B are views for showing a spot power of a reflection surface of a reflection mirror, having a free-curved surface, and the condition of correction of a projection light, in an optic system building up the rear-surface projection-type video display apparatus.
Figure 10B:
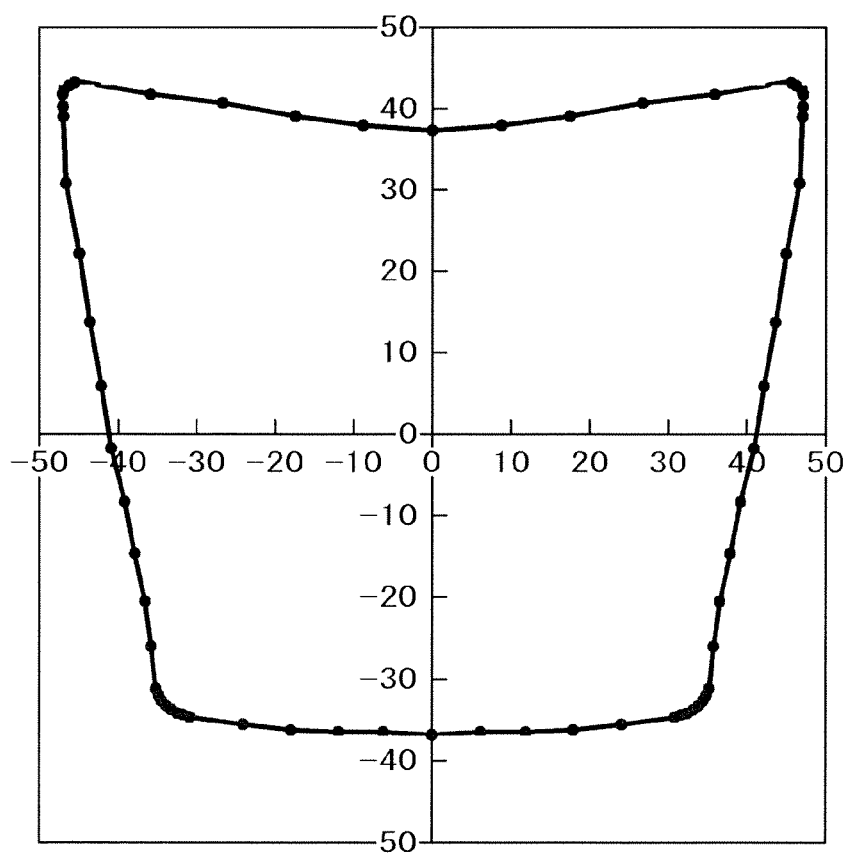

Further, FIGS. 10A and 103 attached herewith shows sizes of light fluxes (e.g., the spot powers) at the respective positions on the reflection surface 102 of the free-curved surface, which builds up the reflection mirror 102 mentioned above, and also the conditions of corrections upon the trapezoidal distortion, which generates accompanying the oblique projection, and the aberrations accompanying the super wide-angle (in particular, high-dimensional coma aberrations and astigmatisms), by means of that reflection mirror 102. From those figures, it can be seen that the corrections can be achieved, preferably, upon the aberrations mentioned above, according to the optic system including the reflection mirror 102 mentioned above therein. And, with adoption of such optic system, as apparent from those FIGS. 6 and 7, since the visual lights from the video projection apparatus (projector) 101 are projected in a rectangular shape on the transmission screen 130, the Fresnel lens 136 (or 166) building up the transmission screen 130, in particular, the Fresnel surfaces L141-L143 (or L162 and L164) making up the Fresnel lens can be formed in a longitudinal (the horizontal) direction on the above rectangular projection surface, different from those, such as, the coaxial circular shape (i.e., the circular Fresnel method) of the conventional Fresnel lens.

Figure 11:
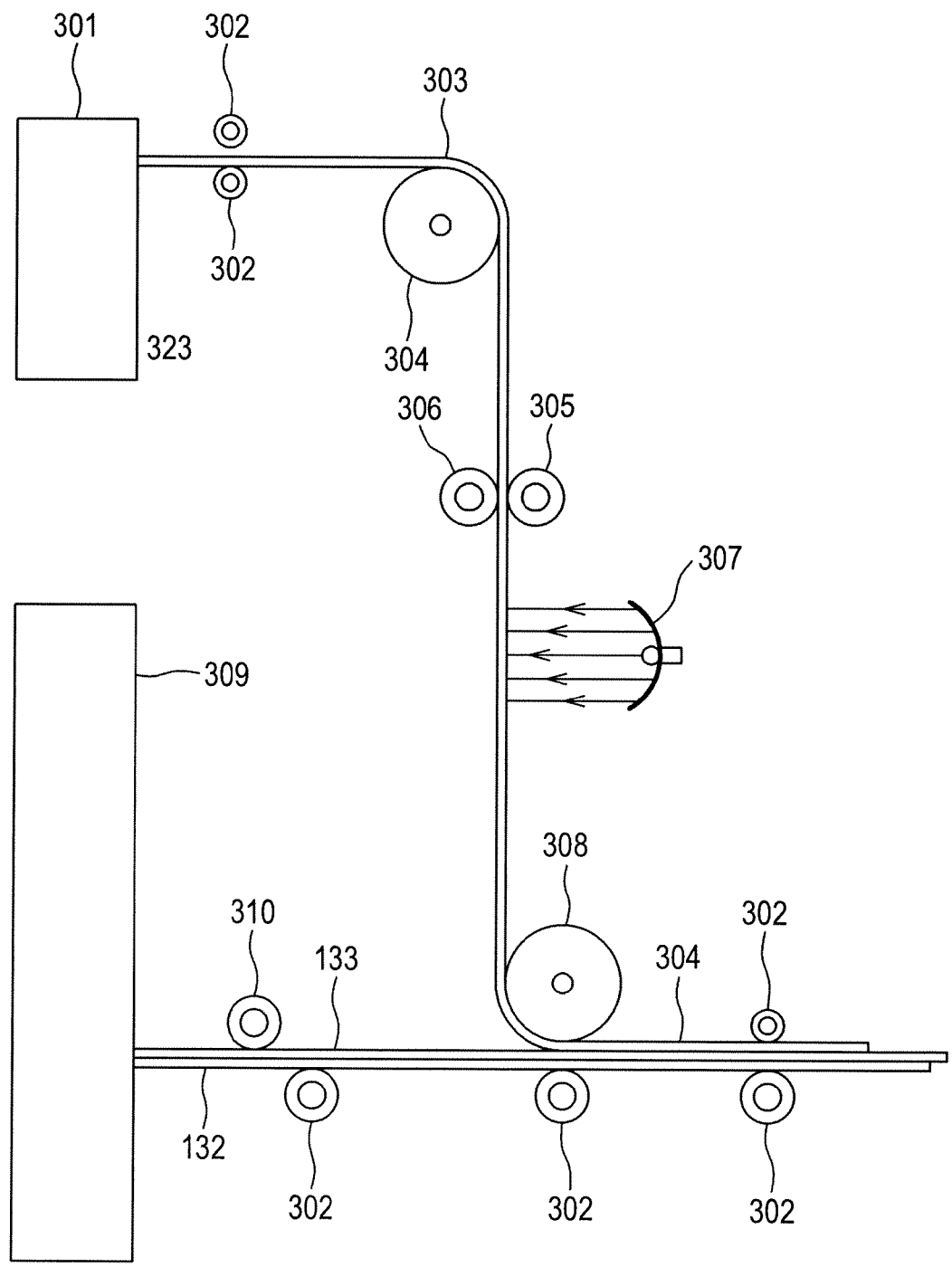
FIG. 11 is a view for showing a method and an apparatus for manufacturing the transmission screen having the Fresnel lens, which builds up the rear-surface projection-type video display apparatus.

Thus, as was mentioned above, with a Fresnel lens (so-called, a linear Fresnel lens), forming the Fresnel surfaces, linearly, by a large number thereof in parallel with, along with the longitudinal (the horizontal) direction of the rectangular projection surface, it can be manufactured, easily and in a relatively simple manner, different from the conventional coaxial circular Fresnel lens. Hereinafter, explanation will be given about a method for manufacturing the transmission screen 130 and an apparatus for that, by referring to FIG. 11 attached herewith. In this FIG. 11, a basic material of the Fresnel sheet (hereinafter, "Fresnel sheet base-material") 303, which is wound round like a roll shape, is supplied or fed under the condition of being flat, by a sheet feeder machine 301. In this instance, on one side of the surfaces of the sheet is applied a resin curable by ultraviolet rays, visible rays or electron beams, and further the Fresnel lens configuration is formed thereon by a linear Fresnel former roll 305. Thereafter, the sheet being formed the Fresnel lens thereon is cured or harden, for example, by the light from an irradiating device (for example, a lamp) 307 for irradiating the ultraviolet rays, the visible rays or the electron beams. On the other hand, a gluing (adhesive) agent is applied on the surface differing from the surface, on which the Fresnel lens is formed, by an application roller 306.

On one side, the screen base-material 132 is formed to be sheet-like by an extruding shaping machine 309, and thereafter, the diffusion layer 133 is formed on one (1) of the surfaces thereof, (an upper surface, in the present example), and it is pressed on and fixed with the screen base-material 132 in one body, by a pressure roller 310. Furthermore, two (2) kinds of sheets mentioned above are glued (adhered) to be unified in one (1) body, by the pressure roll for the Fresnel sheet, and thereafter, are cut out into a necessary size. However, in this instance, the Fresnel sheet base-material 303 mentioned above, since it is supplied under such condition of being wound like a roll, as was mentioned above, is preferable to be equal to or less than 500 µm, for example, in the thickness thereof, and further by taking a fading amount, etc., of the visual light into the consideration, in particular, it is preferable to be equal to or less than 300 µm. Also, as a material thereof are preferable polycarbonate, polyethylene terephthalate (PET), polypropylene, etc., having high transmission factor, and further by taking a stability of sizes thereof into the consideration, polycarbonate and polyethylene terephthalate are preferable, i.e., so-called a material having low in hygroscopicity.

On the other hand, as the screen base-material, a material having high transmission factor is preferable; such as, acryl, polyethylene, polyethylene, etc., for example. Also, about thickness, of course, differing from depending on the size of the screen, but judging from an experience/inspection of measuring an amount of a dent formed when pushing down it by a finger, when t/D, a ratio between a diagonal size of the screen and the thickness of the screen base-material, is 0.25%, the mechanical strength is insufficient, and for that reason, the screen is bent, largely, if the screen is pushed down by a finger. On the other hand, if this ratio exceeds 0.5%, the mass thereof becomes large, and there is generated a necessity of increasing the mechanical strength on the apparatus as a whole; this results into cost-up.

Also, for lightening the drop or lowering of the contrast due to the external lights, it is preferable to apply a material having a low transmission factor for the visible rays, as the screen base-material. This is because, comparing to the fact that for the external lights to enter into the screen and be diffused by diffusing materials, and thereafter, again, to exit towards to the observing side, they must pass through the screen base-material twice (2 times), the visual lights must pass only once (1 time), and therefore, an attenuation of the external lights is proportional with a square of absorption factor (1−(transmission factor of base material+surface reflectivity)). Further, the inventors of the present invention and other (s) confirm, for obtaining a favorable contrast performance, from a relationship between a screen gain of the transmission screen (Gs: a ratio between brightness of an emission light and a luminance of an incident light) and the transmission factor (Ts), that it is sufficient enough to determined them within regions satisfying the following conditional equations:

0.6<Gs<2.0

0.3<Ts<1.0

However, since the transmission screen 130, the details of which are mentioned above, has a one-piece structure, and also since the linear Fresnel lens, which is provided on the incident surface of the visual lights, can be manufactured by mass production, continuously, it is possible to increase productivity thereof, and to reduce costs of the screen, comparing to those of the Fresnel lens of two-pieces structure. Of course, comparing to the method for forming the Fresnel lens of the conventional circular Fresnel method, i.e., the method for forming it, separately, with using a die, it is possible to increase the productivity thereof, greatly or remarkably.

Figure 12:
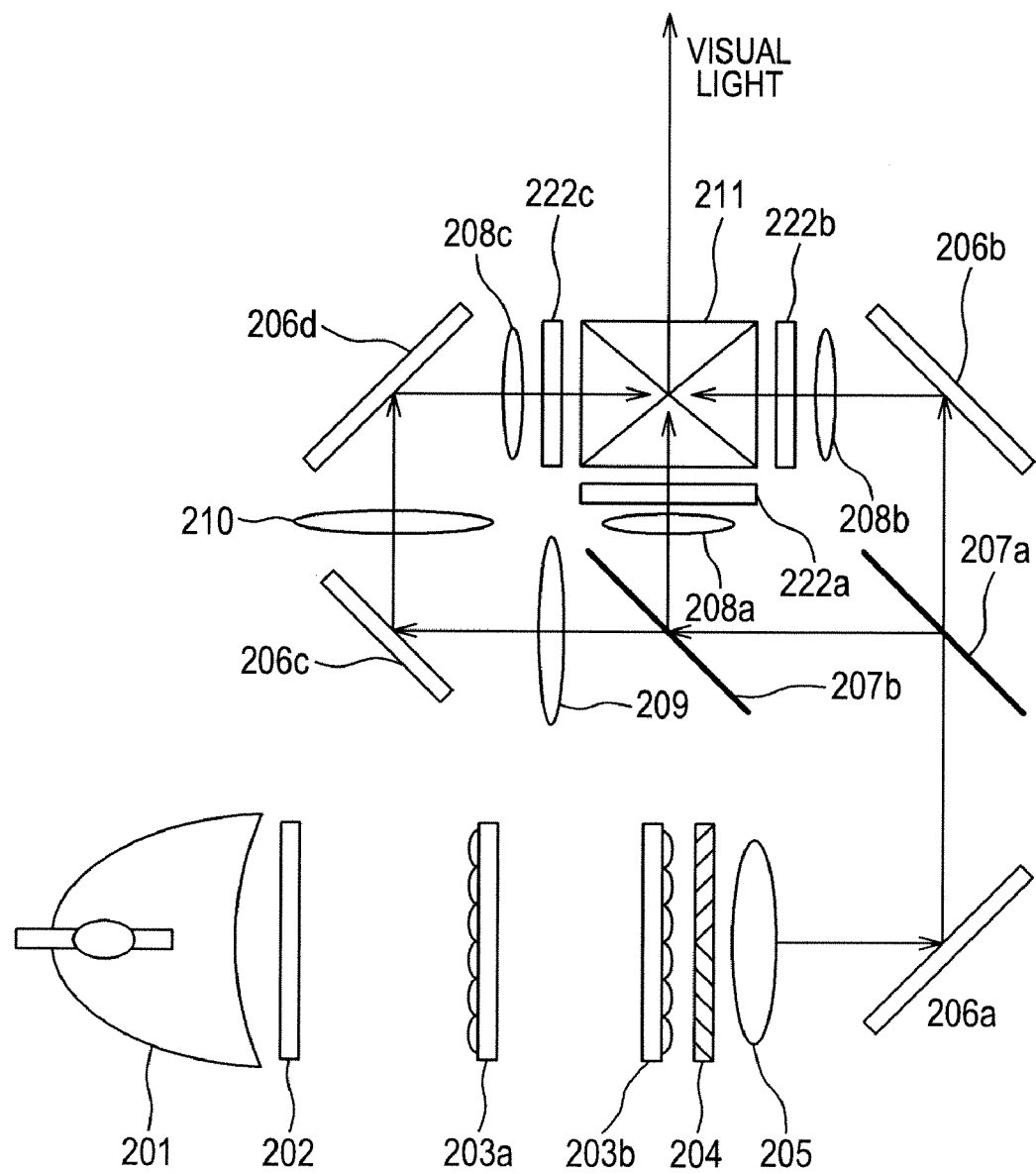
FIG. 12 is a block diagram for showing an example of the structure of a video projection apparatus (i.e., a projection) building up the rear-surface projection-type video display apparatus.

Further, although FIG. 12 attached herewith shows an example of an outlook structure of the video projection apparatus (projector) 101, in particular, of parts except for the optic system mentioned above; however, this is already known, in general, and therefore, herein, this will be explained, briefly, hereinafter. Thus, within that video projection apparatus (projector) 101, a light source 199 is made up with a lamp tube 200 and a reflector 201. This lamp 200 is a white color lamp made from a high-pressure mercury lamp. Also, the reflector 201 has a reflection surface of a rotational parabolic configuration, for example, which is disposed so as to cover the lamp 200 from a behind side thereof, and has a circular or polygonal emission opening. And, the lights emitting from this lamp tube 200 are reflected upon the reflector 201 having the reflection surface of the rotational parabolic configuration, and are emitted as a light flux, nearly in parallel with an optical axis thereof. The lights emitting from the light source 199 enter into an integrator of a multi-lens method.

The integrator 203 of the multi-lens method is built up with a first multi-lens element 203a and a second multi-lens element 23b. Further, the first multi-lens element 203a has a rectangular lens cell configuration thereof, similar to that of the liquid crystal panel 222a, 222b or 222c, seeing it in a direction of the optical axis 215, and is made up with disposing plural numbers of lens cells in a matrix-like manner, wherein it divides the light entering from the light source into plural numbers of lights by the plural numbers of lens cells, and thereby guiding them to pass through the second multi-lens element 203b and a polarization converter element 204, effectively. Thus, the first multi-lens element 203a is so designed that the lamp tube 200 and each lens cell of the second multi-lens element 203b build up an optically conjugate relationship.

The second multi-lens element 203b has a lens cell configuration, similar to the first multi-lens element 203a, being rectangular seeing it in the direction of the optical axis 215, and has the structure of disposing plural numbers of lens cells in the matrix-like manner, wherein each of the lens cells building up that lens element projects (represents or maps) a configuration of the corresponding lens cell of the first multi-lens element 203a onto an overlay lens 208a, 208b or 208c, as well as, the liquid crystal panel 222a, 222b or 222c, respectively. And, in this process, due to the function of the polarization converter element 204, the lights emitting from the second multi-lens element 203b are aligned into a predetermined polarization. At the same time, a projection video by each lens cell of the first multi-lens element 203a is overlaid by the function of the overlay lens 208a, 208b or 208c, respectively, and thereby achieving a uniform distribution of a light amount over the liquid crystal panel 222a, 222b or 222c, corresponding thereto, respectively.

According to such present invention as was mentioned above, there can be achieved a superior effect of, i.e., providing a rear-surface projectin0type video display apparatus of an extremely new structure, e.g., have no necessity of the so-called housing, and thereby being superior in portability and cheaply producible.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A rear-surface projection-type video display apparatus, comprising:
   a transmission-type screen, which is disposed within an interior space of a room having external light, under a condition of exposing both surfaces thereof in said interior space of the room, and is configured to transmit a visual light projected onto a rear surface therethrough, so as to display it on a video display surface on a front surface; and
   a video projection apparatus, which is disposed at a predetermined position on a rear surface side of said transmission-type screen, and configured to project the visual light from a rear surface of said transmission-type screen, enlargedly, wherein:
   said transmission-type screen:
      has a linear Fresnel lens having Fresnel lens surfaces, covering over an entire light receiving surface for receiving the visual light, which is enlargedly projected from said video projection apparatus,
      the Fresnel lens is configured to guide the visual light received from said video projection apparatus into a direction perpendicular to said video display surface, and
      the Fresnel lens is configured to guide the external light within said interior space of the room, the external light emitted from a first direction differing from that of said video projection apparatus and guided in a second direction other than that perpendicular to said video display surface, and
   said transmission-type screen has a rectangular configuration, and the Fresnel lens surfaces making up the Fresnel lens, which is formed on the entire of the video display surface, are formed in a direction parallel with a longitudinal direction of said screen, linearly, aligning with each other.

2. The rear-surface projection-type video display apparatus, as described in the claim 1, wherein said video projection apparatus is disposed at a position of a lower portion on the rear surface side of said transmission-type screen, and the video projection apparatus projects the visual light to the light receiving surface of said transmission-type screen from said position.

3. The rear-surface projection-type video display apparatus, as described in the claim 2, wherein a Fresnel angle defined by the Fresnel surfaces building up said linear Fresnel lens are so determined that the visual light projecting from said video projection apparatus, after entering into said Fresnel lens, is reflected by said Fresnel lens surfaces to emit, while the external light within said interior space, transmitting though said Fresnel lens, emits downwards.

4. The rear-surface projection-type video display apparatus, as described in the claim 3, wherein:
   said video projection apparatus comprises:
      a light source,
      a modulator unit, which is configured to modulate a part of light from said light source, so as to form the visual light, and
      an optic system, which is configured to project the visual light formed by said modulator unit, enlargedly, directing to the light receiving surface of said transmission-type screen,
      said optic system enlarges the visual light by a reflection plate formed with a free-curved surface, at a final stage, and irradiates the visual light on the light receiving surface of said transmission-type screen.

5. The rear-surface projection-type video display apparatus, as described in the claim 1, further comprising:
   a first member, which is configured to fix said transmission-type screen at a predetermined position within said interior space, and
   a second member, which is configured to dispose said video projection apparatus at a predetermined position with respect to said transmission-type screen, in a part of said fixing member.

6. The rear-surface projection-type video display apparatus, as described in the claim 5, wherein said position fixing first member is detachable with respect to said transmission-type screen.

* * * * *